(No Model.) 4 Sheets—Sheet 1.
R. E. GRAY.
WATER WHEEL.
No. 447,725. Patented Mar. 3, 1891.
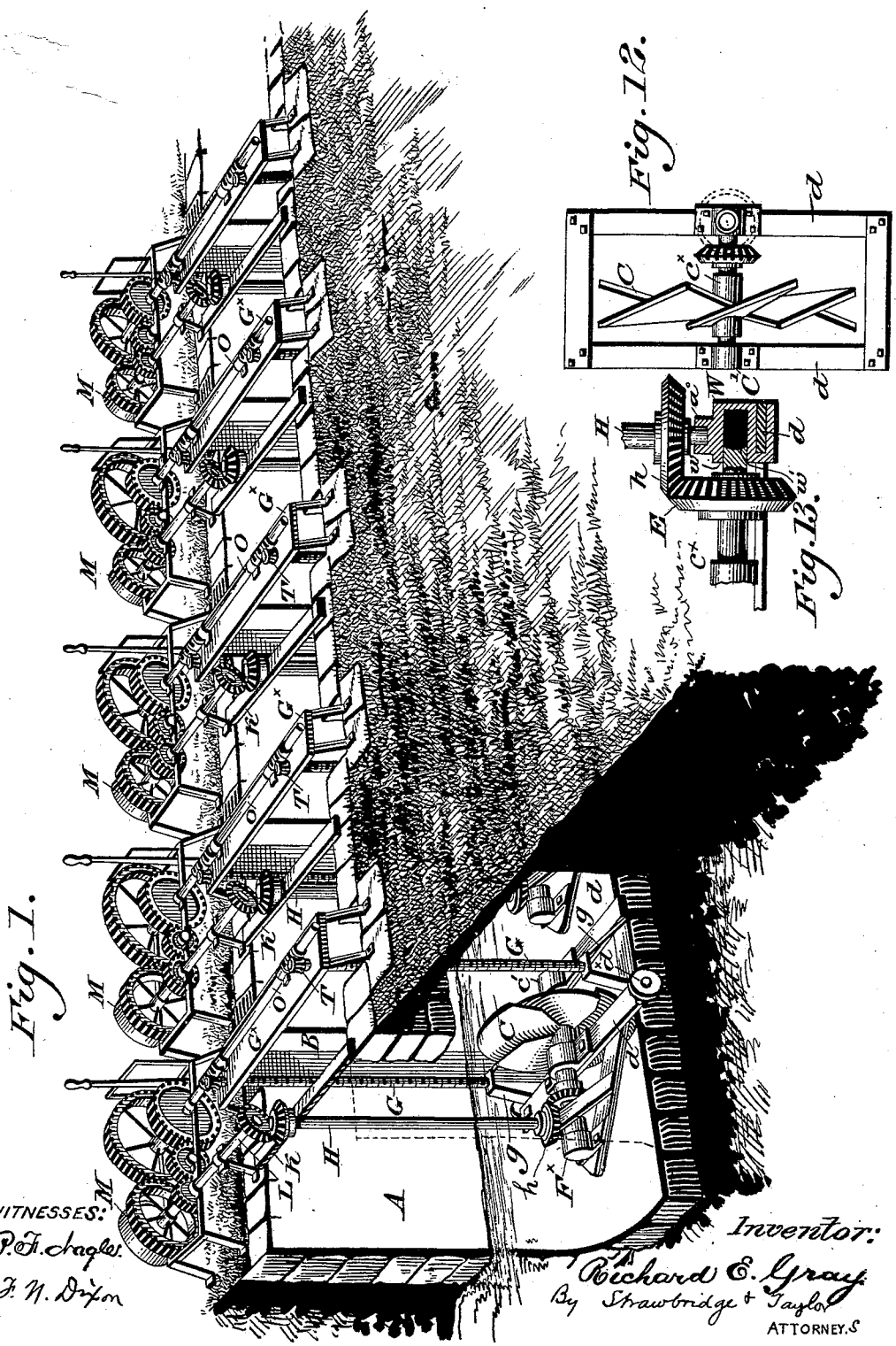

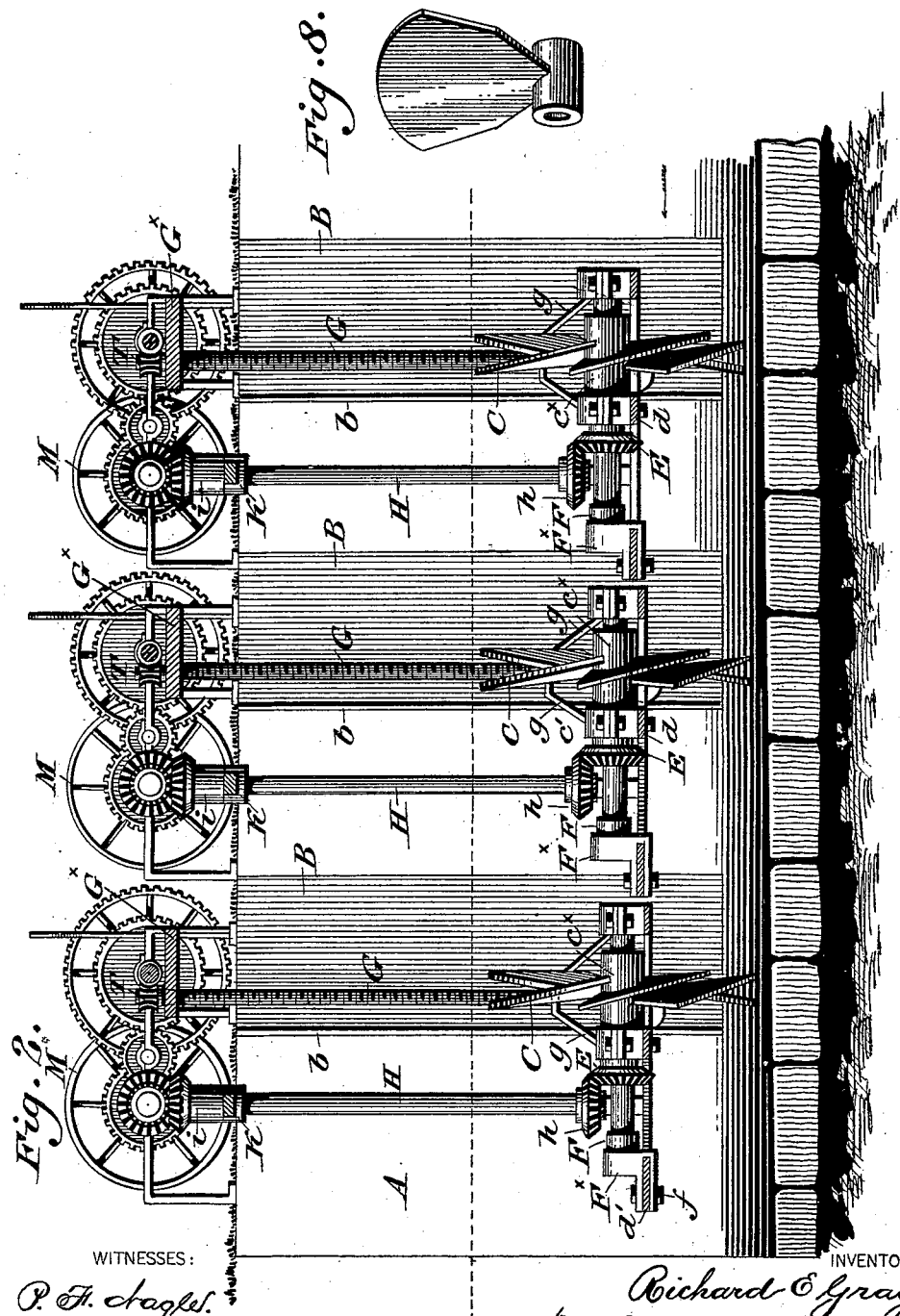

(No Model.) 4 Sheets—Sheet 3.
R. E. GRAY.
WATER WHEEL.
No. 447,725. Patented Mar. 3, 1891.
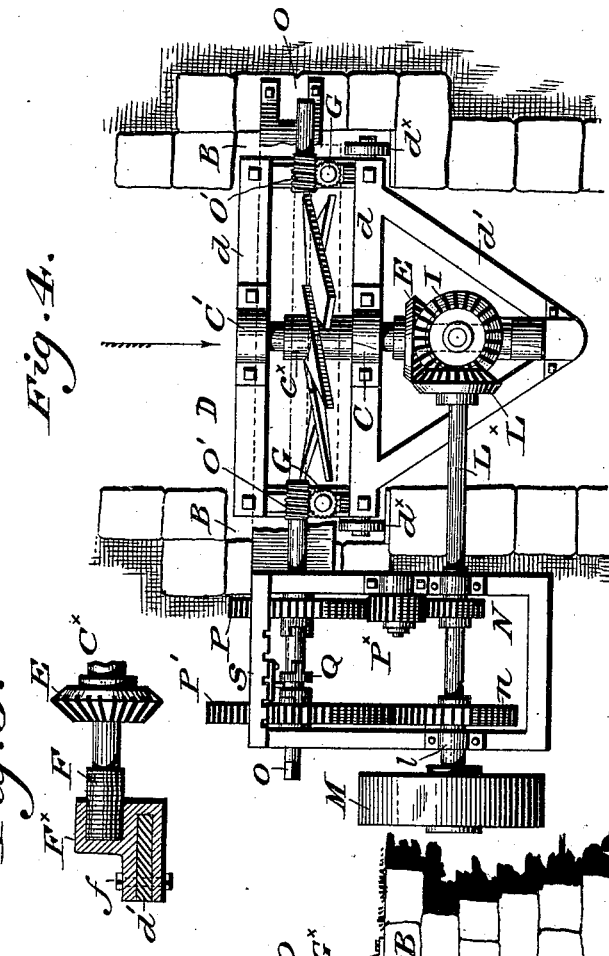
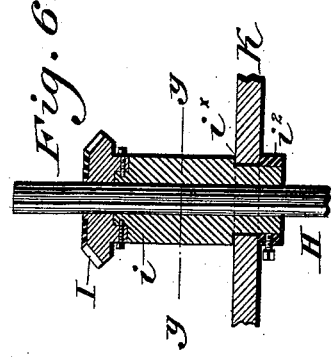
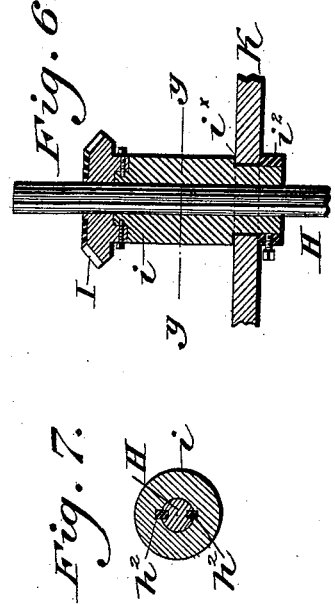
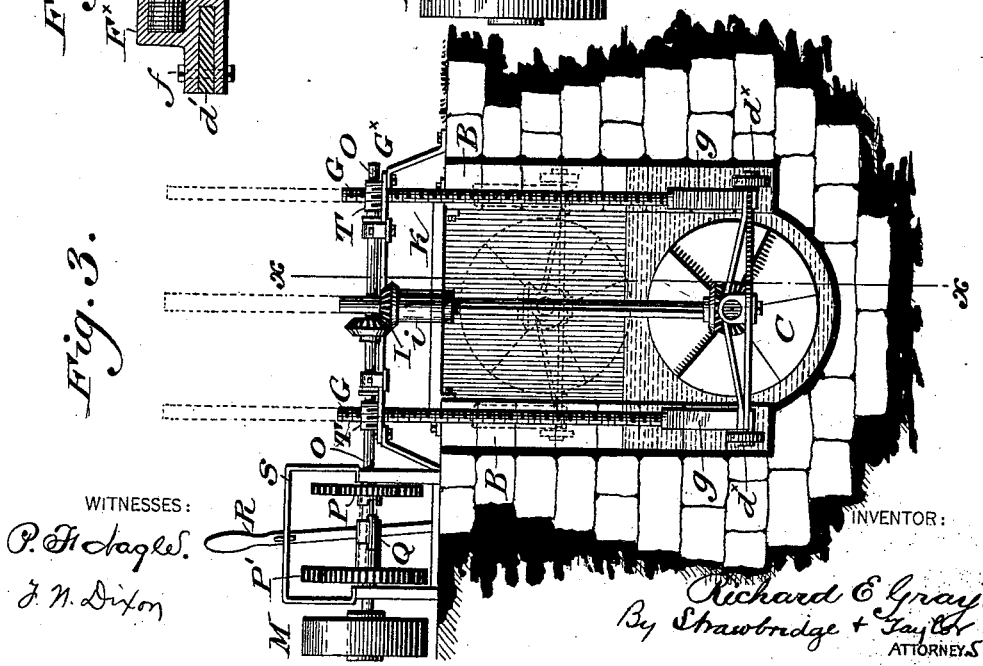
WITNESSES:
P. H. Nagle
J. N. Dixon
INVENTOR:
Richard E. Gray.
By Strawbridge + Taylor
ATTORNEYS

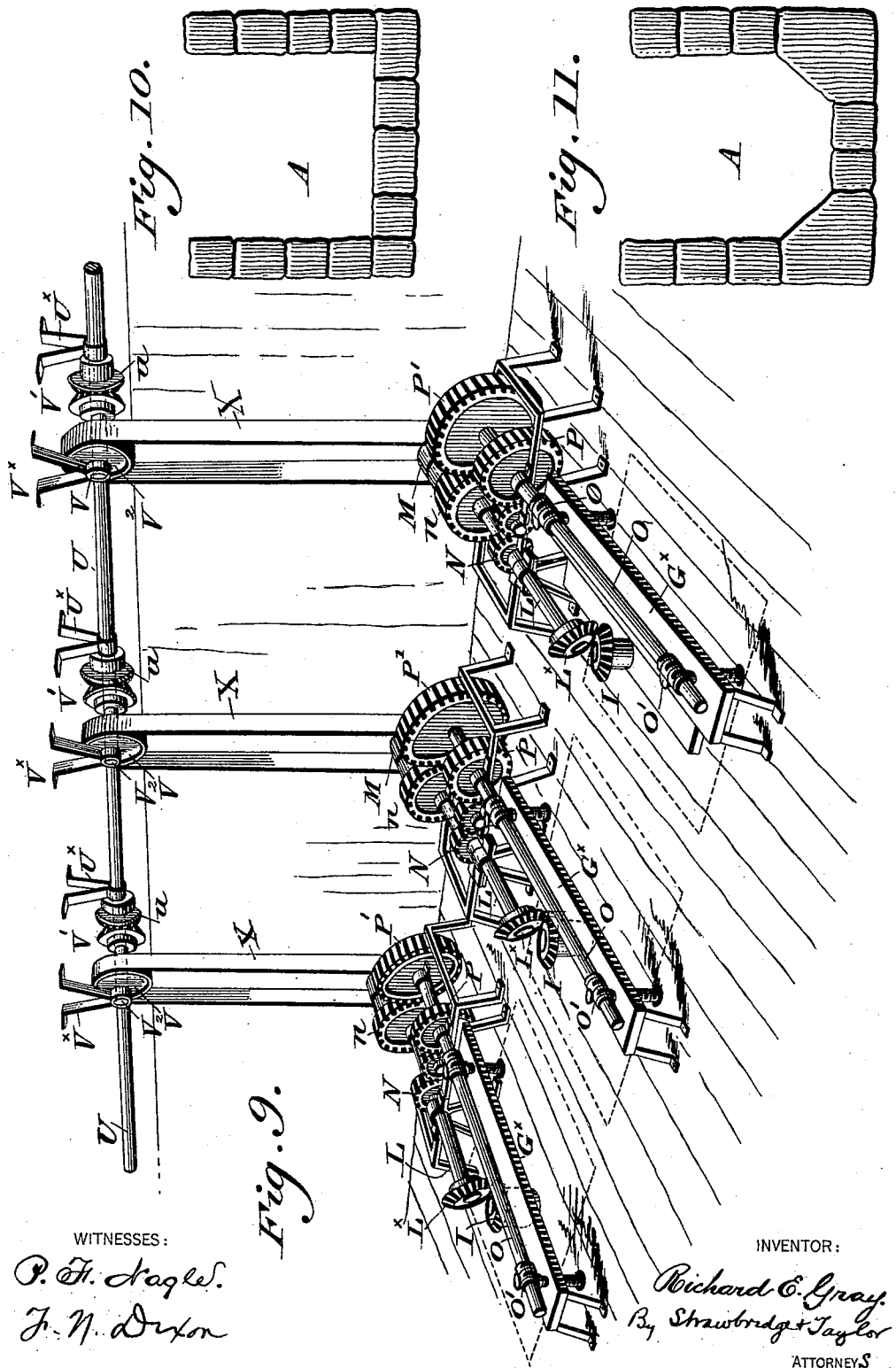

UNITED STATES PATENT OFFICE.

RICHARD E. GRAY, OF MUNCY, PENNSYLVANIA, ASSIGNOR TO THE GRAY CURRENT MOTOR COMPANY, OF ELGIN, ILLINOIS.

WATER-WHEEL.

SPECIFICATION forming part of Letters Patent No. 447,725, dated March 3, 1891.

Application filed March 17, 1890. Serial No. 344,170. (No model.)

*To all whom it may concern:*

Be it known that I, RICHARD E. GRAY, a citizen of the United States, residing at Muncy, Pennsylvania, have invented certain new and useful Improvements in Water Wheels, of which the following is a specification.

My invention relates to a class of devices in which a current of water is utilized to occasion the rotation of a water wheel or of water wheels subjected to its action.

It is the object of my invention to so arrange the wheel or wheels of a water motor and to so confine or direct the water in which said wheels are submerged, that the maximum of power can be obtained from a given head of water.

A further object is the mounting of a series of water wheels in such manner that individual wheels may be removed at will without interference with the operation of the remaining wheels.

In the drawings I illustrate and herein I describe a good form of a convenient embodiment of my invention, the particular subject matter claimed as novel being hereinafter definitely specified.

In the drawings, Figure 1 is a perspective view of a flume provided with a series of water wheels, a portion of the foreground being supposed removed to exhibit the interior of the flume. Fig. 2 is a vertical longitudinal central partly sectional elevation on the line *x x* of Fig. 3. Fig. 3 is an end elevational view of a flume, showing in place therein a water wheel, its framing, and connected gearing. Fig. 4 is a top plan view of one of the water wheels, a form of water wheel frame, and connected gearing. Fig. 5 is a detail view of one form of what I term the thrust box of the framing. Fig. 6 is a detail perspective view of a portion of one of the upright shafts, showing the bevel wheel at its upper end, the sleeve, and the sleeve holder bar. Fig. 7 is a view in cross section taken on the line *y y* of Fig. 6. Fig. 8 is a detail view of one of the vanes of a water wheel. Fig. 9 is a perspective view of a portion of three sets of gearings employed in connection with three water wheels, not shown, illustrating their connection with a common power receiver or driven shaft. Figs. 10 and 11 are respectively end views of two forms of inclosing flumes to which resort may be had in the practice of my invention. Fig. 12 is a top plan view of a good form of wheel frame and thrust box, and one which in practice I employ in preference to the form shown in Figs. 4 and 5. Fig. 13 is a side elevational partly sectional view of the thrust box and a portion of the frame and supported devices shown in Fig. 12.

Similar letters of reference indicate corresponding parts.

In the drawings, A is an artificial open topped waterway or channel, which I herein term a flume, the same being preferably approximately U-shaped in cross section and longitudinally inclined at any desired grade. The flume may exist as a trench in the ground, or as an elevated water way, as may be preferred. In the drawings I show it as formed as a trench, and having a bottom and walls of masonry faced with cement. It may, however, be constructed of wood, or of other material. The bottom of the flume is as stated preferably curved in cross section,—the curve being such that its radius approximates that of the water wheels situated therein, whereof hereinafter.

B B are a pair of recesses formed opposite each other, one in each of the walls of the flume. These recesses extend from the top of the wall down conveniently to the point where the walls begin to converge. A series of these pairs of recesses exist in the flume at the place where it is desired to form a water motor. The downstream wall of each recess is preferably provided with or covered by a plate of iron, *b*, as shown particularly in Fig. 2.

In the drawings C C C are a group or series of water wheels, which with their connected gearings form what I term a water motor. Each wheel and its immediate connections is, in the embodiment of my invention shown in the drawings, complete in itself, and structurally independent of its neighbors, and, as all are alike in construction, mounting and operation, I herein describe but one of them in detail,—but I desire to preface the description by the statement that it is applicable alike to all the wheels and their connections.

D is what I term the wheel framing, the same being a structure designed to support the wheel, and being itself arranged within the flume and having its extremital portions entered respectively within opposite recesses B.

In the construction of framing shown in Figs. 1, 2, 3, and 4, of the drawings, $d\ d$ are two longitudinal members thereof, connected by transverse ties,—and $d'$ is a bracket on the downstream side of said framing. The members $d\ d$ are spaced apart a distance equal to the breadth of a recess B, and the extremities of the downstream member are conveniently equipped each with a roller $d^{\times}$ through which under the pressure of the water said frame bears against the plates $b$.

The letter C is applied to the water wheel itself, which is mounted upon and conveniently rotates idly with a short axle $C^{\times}$ extending lengthwise of the flume, and entered in suitable bearings $C'$ upon the framing D.

$g\ g$ are a pair of keepers or bails, one of which is secured to each end of a framing D, and $G^{\times}$ is a guide or bridge piece spanning the flume above the recess B. G G are a pair of lifting rods, each as to its lower end being secured to one of the keepers $g$, both being screw threaded as to their body portions, and both passing through apertures in the bridge $G^{\times}$. By the lift and drop of these lifting rods the vertical movement or adjustment of the wheel and its framing may be effected.

The water wheel itself may be of any preferred construction,—that shown in the drawings consisting of a hub in which are mounted a circumscribing series of vanes,—the angle of inclination and other details of arrangement of which are to be governed by the velocity of the water, the amount of power required, and various other considerations. The outline of the wheel, when a flume of the form particularly shown in Fig. 3 is employed, is preferably of a radius about corresponding to the transverse profile of the bottom of the flume, and the closer the said wheel outline conforms to the shape of the flume the better will be the results obtained.

The rear or downstream portion of the axle $C^{\times}$ is provided with a bevel wheel E, and its extremity is dressed off and bears against what I term a thrust block F.

The thrust block F is preferably a block of lignum vitæ or other hard wood and it is conveniently embedded or mounted in a block holder $F^{\times}$ shown in detail in Fig. 5, which block holder is recessed, saddled upon one of the members of the bracket $d'$, and secured thereto by a stay pin $f$.

H is a vertical shaft, the lower end of which is equipped with a bevel wheel $h$ in engagement with the wheel E, and upon and to the upper portion of which shaft are mounted and keyed by means of two keys $h^2$, a bevel wheel I and sleeve $i$, Figs. 6 and 7.

For clearness of illustration the sleeves are but partially shown in Fig. 1. The bevel wheel and sleeve may be formed as one casting, or may be, as shown, formed as separate members and secured together. It is desired that the wheel I and its sleeve $i$ should, while rotating with the shaft, H, at the same time be fixed and invariable as to their elevation notwithstanding any vertical movement or adjustment of the said shaft,—and this I accomplish by providing a holder bar K rigidly secured in any preferred manner to fixed points of support, and embodying an aperture by means of which it is seated upon the sleeve $i$ and against a shoulder $i^{\times}$ which said sleeve embodies, to which sleeve, below the holder bar, is secured a retaining collar $i^2$, as clearly shown in Fig. 6.

L is a counter shaft mounted in suitable pedestals or supports $l$, the character of which will be governed by the surroundings,—which shaft is at its inner end provided with a bevel wheel $L^{\times}$ in mesh with the wheel I, and to the outer end of which is secured a pulley wheel M with which the shafting or machinery to be driven by the water power is connected.

In order to enable the utilization of the power of the wheels in the lifting of their own weight in the adjustment of the wheels and framing in position to suit a given head of water which may exist in the flume, I resort to the following arrangement:

N is a small and $n$ a larger toothed pinion wheel, both of which are mounted upon the shaft L and rotate with it. O is a shaft mounted in suitable pedestals in parallelism with the shaft L.

P P' are two toothed pinions, mounted upon the shaft O and respectively opposite the pinions N and $n$. The pinion P' is in mesh with the pinion $n$, and the pinion P is in engagement, through the intervention of an idler pinion $P^{\times}$, with the pinion N, as particularly illustrated in Fig. 4. The pinions P and P' ordinarily run idly upon the shaft O. They however at their hubs each embody or are provided with a clutch seat.

Q is a clutch mounted and keyed upon the shaft O between the pinions P P' and adapted to be thrown by the throw of its lever R, which lever is pivoted to any convenient fixed point of support, into engagement with either of said clutch seats. The pinion P' is ordinarily by reason of its engagement with the pinion $n$, idly rotated upon the shaft O in a direction opposite to that of said pinion $n$,—while the pinion P by reason of its engagement with said pinion N through the intervention of an idle wheel, rotates idly in the same direction as said pinion N. The shaft O, therefore, may by means of its own keyed clutch Q be placed in engagement with and rotated by either of the oppositely rotating pinions P P'.

S is a bracket frame constructed in adjacency to the lever R, and embodying a series of recesses in which the said lever may be entered to retain the clutch Q in engagement with either of the pinions P P'.

T T are wheels, provided with both internal and external threads, and one of which is threaded upon, the upper extremity of each lifting rod G. It is obvious that rotation of these wheels will, through the engagement of their internal threads with the threads of the lifting rods, according to the direction of such rotation, occasion the elevation or depression of said lifting rods, and consequently of the connected framing D and wheel C.

Each shaft O extends along in adjacency to both members of a pair of wheels T, and is provided or formed with two worms O', which are respectively engaged one with each of said wheels T,—so that rotation of said shaft O occasions the simultaneous and similar rotation of both said wheels T.

In practice I provide a shaft or power receiver, to which, by belt or other connection, the pulleys M are all connected, which shaft or receiver therefore receives the aggregate of the power developed in all of the wheels employed. Thus in Fig. 9 is shown a shaft U, mounted in hangers $U^\times$, and provided with a series of bevel wheels $u$. V are counter shafts, each supported in a hanger $V^\times$, each provided with a bevel wheel V', in mesh with a bevel wheel $u$ of the shaft U,—and each also provided with a belt wheel $V^2$. X are belts, each of which connects one of the wheels M with one of the wheels $V^2$.

It will be obvious that many forms of mechanism for connecting the wheels M with the shaft U, other than the form described may be, without departure from my invention, resorted to to connect the series of independent water wheels or motors with a common shaft or power receiver.

In practice any desired series of water wheels may be employed, the number being proportioned to the power required.

It is apparent that the arrangement of the water wheels as herein described, in a series extending in succession behind each other along the line of a flume, forms a compact and economical water motor. The fact that the wall or bottom of the flume is conformed as explained to the outline of the wheels renders it impossible for any considerable quantity of the water in its flow to avoid acting upon the wheels and therefore the maximum of power is obtained from a given head of water. A current of moderate velocity, such as is imparted to the water by only a slight incline of the flume, when acting upon a series of wheels arranged according to my invention, develops a much greater amount of power than can be obtained by the use of any other water wheels of which I have knowledge. After the water in passing along the flume has operated upon and passed one wheel it has not become diverted from its course as would be the case were a flume not employed,—nor has it intermitted its horizontal or approximately horizontal flow, but passes on to the next wheel and operates upon it with unabated efficiency.

In the arrangement herein described it is obvious that a given battery or series of wheels being employed, only such number as is required for the work in hand need be put in service, and the remainder be permitted to remain idle. It is also obvious that each wheel and its connections being independent of all the others, if a wheel becomes broken or dismantled it may be removed without stopping or affecting the work of the others.

Although I have described the flume employed as being U-shaped in cross section, I do not desire to restrict myself to that particular form of inclosing flume, as it is apparent that good results may be obtained by the use of an inclosing flume which has either, as shown in the modified construction of Fig. 10, a flat bottom, or, as shown in the modified construction of Fig. 11, an angularly concaved bottom. It is obvious that if, in connection even with the square bottomed flume of Fig. 10, a water wheel of diameter approximating the breadth of said flume be employed, and lowered to a position in which it almost sweeps the floor of said flume, only a small quantity of water could flow past said wheel without directly acting upon it,—and therefore, as said modified constructions of flume have so full a measure of the advantages of the preferred U-shaped form of flume, I consider them equivalents of said U-shaped form.

In Figs. 12 and 13 of the drawings I illustrate a preferred form of wheel frame and thrust box. In said figures the members $d\ d$ of the frame, and their connecting tie bars, are similar to those shown in the other figures of the drawings.

W is the preferred form of thrust box, the same being a block of wood, mounted upon the downstream member $d$ of the frame, conveniently by taking said member into a recess which said block itself embodies. The thrust box embodies an axle recess $w$, into the inner end or bottom of which is fitted the thrust block proper, $w'$, the same being a plug of hard material of any preferred character, and such for instance as lignum vitæ and the outer end of which is preferably rounded.

The other member $d$ of the frame under consideration is provided with a bearing C', and the axle $C^\times$ of the wheel C has its extremities entered in the said bearing C' and said axle recess $w$ respectively. The extremity of the axle $C^\times$ which bears against the thrust block is conveniently concaved to conform to the rounded portion of the said thrust block. The upper portion of the thrust box embodies a vertical recess $a^\circ$ in which the lower extremity of the shaft H is stepped and which permits the engagement of the bevel wheels E and $h$ which the axle $C^\times$ and shaft H respectively carry.

It will be apparent that in the event of the breakage of one of the water wheels, in which case it would be desired to withdraw said wheel, the pulley M will, until disconnected, instead of receiving power from said wheel and transmitting it to the shaft U,—itself receive power from and be driven by said shaft U, and that the power so received may when the clutch Q of the mechanism of the broken wheel is thrown into bite with the appropriate pinion for giving proper rotation to the shaft O be utilized to occasion the elevation and withdrawal of the broken wheel.

Having thus described my invention, I claim and desire to secure by Letters Patent:

1. In combination with a flume, a series of water wheels arranged therein one behind the other, each rotatable in a plane transverse to the axis of said flume, and each mounted in a separate frame, each of which frames is free for independent vertical movement in said flume, means for occasioning the vertical movement of said frames, a power receiver such as a shaft, and gearing by which each wheel is independently connected with said power receiver, substantially as set forth.

2. In combination with a flume, a series of water wheels arranged therein one behind the other, each rotatable in a plane transverse to the axis of said flume, and each mounted in a separate frame, a series of pulleys or shafts, connective gearing for transmitting power from said wheels to said pulleys or shafts, which connective gearing is adjustable so as to be operative in all positions of vertical adjustment of the wheels and their frames, means for occasioning the vertical movement of said wheels and frames, a power receiver such as a shaft, and gearing by which each of the series of pulleys is connected with said power receiver, substantially as set forth.

3. In combination with a flume, a series of water wheels arranged therein one behind the other, each rotatable in a plane transverse to the axis of said flume, and each mounted in a separate frame, which frames are capable of vertical adjustment, a series of pulleys or shafts, connective gearing for transmitting power from said wheels to said pulleys or shafts, which connective gearing is adjustable so as to be operative in all positions of vertical adjustment of the wheels and their frames, lifting mechanism connected with each wheel frame, means for throwing said lifting mechanism into engagement with so as to be operated by the power transmitting gearing, a power receiver such as a shaft, and gearing by which the series of pulleys or shafts before referred to are connected with said power receiver, substantially as set forth.

4. In combination, a flume, a series of independent water wheels mounted for rotation in frames arranged the one behind the other in said flume, a series of independent pulley shafts mounted one in connection with each wheel, mechanism through which the motion of each wheel is transmitted to its own pulley shaft, lifting mechanism connected with each wheel frame, and adapted to be operated by and thrown into and out of connection with its associated pulley shaft, and a power shaft to which are connected the independent pulley shafts of all of the water wheels, substantially as set forth.

In testimony that I claim the foregoing as my invention, I have hereunto signed my name this third day of March, A. D. 1890.

RICHARD E. GRAY.

In presence of—
GEO. H. McDONALD,
THOS. J. RUSHTON.